US012360604B2

(12) United States Patent
Chaudhri et al.

(10) Patent No.: US 12,360,604 B2
(45) Date of Patent: Jul. 15, 2025

(54) QUIET HOURS FOR NOTIFICATIONS

(71) Applicant: Apple Inc., Cupertino, CA (US)

(72) Inventors: Imran A. Chaudhri, San Francisco, CA (US); Gregory Novick, San Francisco, CA (US); Scott Forstall, Los Altos, CA (US); Morgan Grainger, Nashville, TN (US); George R. Dicker, Sunnyvale, CA (US); Tyler Hawkins, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/584,477

(22) Filed: Feb. 22, 2024

(65) Prior Publication Data

US 2024/0231499 A1 Jul. 11, 2024

Related U.S. Application Data

(63) Continuation of application No. 18/167,808, filed on Feb. 10, 2023, now Pat. No. 11,914,782, which is a
(Continued)

(51) Int. Cl.
*G06F 3/01* (2006.01)
*G06F 3/048* (2013.01)
(Continued)

(52) U.S. Cl.
CPC .............. *G06F 3/016* (2013.01); *G06F 3/048* (2013.01); *G06F 3/0481* (2013.01);
(Continued)

(58) Field of Classification Search
CPC ..... H04W 4/02; H04W 4/021; H04M 19/047; H04M 1/72454; H04M 1/72463;
(Continued)

(56) References Cited

U.S. PATENT DOCUMENTS 4,480,154 A 10/1984 Klee
5,483,261 A 1/1996 Yasutake
(Continued)

FOREIGN PATENT DOCUMENTS

CN 1658182 A 8/2005
CN 1671156 A 9/2005
(Continued)

OTHER PUBLICATIONS

Corrected Notice of Allowance received for U.S. Appl. No. 17/454,983, mailed on Jan. 18, 2023, 8 pages.
(Continued)

*Primary Examiner* — Dung Hong
(74) *Attorney, Agent, or Firm* — Kubota & Basol LLP

(57) ABSTRACT

In some implementations, a computing device can be configured to automatically turn off notifications when generating a notification would cause a disturbance or be unwanted by a user. The device can be configured with quiet hours during which notifications that would otherwise be generated by the computing device can be suppressed. In some implementations, quiet hours can be configured as a time period with a start time and an end time. In some implementations, quiet hours can be derived from application data. For example, calendar data, alarm clock data, map data, etc. can be used to determine when quiet hours should be enforced. In some implementations, the device can be configured with exceptions to quiet hour notification suppression. In some implementations, the user can identify contacts to which the quiet hours notification suppression should not be applied.

30 Claims, 9 Drawing Sheets

Related U.S. Application Data continuation of application No. 17/454,983, filed on Nov. 15, 2021, now Pat. No. 11,582,342, which is a continuation of application No. 15/149,013, filed on May 6, 2016, now Pat. No. 11,178,271, which is a continuation of application No. 13/842,682, filed on Mar. 15, 2013, now Pat. No. 9,348,607.

(60) Provisional application No. 61/656,935, filed on Jun. 7, 2012.

(51) Int. Cl.
| | |
|---|---|
| *G06F 3/0481* | (2022.01) |
| *G06F 3/0484* | (2022.01) |
| *G06F 3/0488* | (2022.01) |
| *G06F 3/16* | (2006.01) |
| *H04M 1/72451* | (2021.01) |
| *H04M 1/72457* | (2021.01) |
| *H04M 1/72463* | (2021.01) |
| *H04M 19/04* | (2006.01) |

(52) U.S. Cl.
CPC .......... *G06F 3/0484* (2013.01); *G06F 3/0488* (2013.01); *G06F 3/167* (2013.01); *H04M 1/72451* (2021.01); *H04M 1/72457* (2021.01); *H04M 1/72463* (2021.01); *H04M 19/045* (2013.01); *G06F 2203/04803* (2013.01)

(58) Field of Classification Search
CPC ......... H04M 1/72457; H04M 1/72451; H04M 19/045; G06F 3/016; G06F 3/048; G06F 3/0481; G06F 3/0484; G06F 3/0488; G06F 3/167; G06F 2203/04803
See application file for complete search history.

(56) References Cited

U.S. PATENT DOCUMENTS

| | | | |
|---|---|---|---|
| 5,488,204 A | 1/1996 | Mead et al. | |
| 5,812,648 A | 9/1998 | Wanner | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,570,557 B1 | 5/2003 | Westerman et al. | |
| 6,606,504 B1* | 8/2003 | Mooney ............... | H04M 1/663 455/412.2 |
| 6,677,932 B1 | 1/2004 | Westerman | |
| 6,690,387 B2 | 2/2004 | Zimmerman et al. | |
| 6,701,160 B1* | 3/2004 | Pinder .................. | H04M 1/663 455/565 |
| 6,928,300 B1* | 8/2005 | Skinner ................ | G06Q 10/109 455/418 |
| 6,968,216 B1* | 11/2005 | Chen .................. | H04M 1/72451 455/566 |
| 7,015,894 B2 | 3/2006 | Morohoshi | |
| 7,184,064 B2 | 2/2007 | Zimmerman et al. | |
| 7,614,008 B2 | 11/2009 | Ording | |
| 7,633,076 B2 | 12/2009 | Huppi et al. | |
| 7,653,883 B2 | 1/2010 | Hotelling et al. | |
| 7,657,849 B2 | 2/2010 | Chaudhri et al. | |
| 7,663,607 B2 | 2/2010 | Hotelling et al. | |
| 7,840,238 B2* | 11/2010 | Silver ..................... | H04M 3/02 455/567 |
| 7,844,914 B2 | 11/2010 | Andre et al. | |
| 7,929,687 B2* | 4/2011 | Itoh ....................... | H04N 1/32005 379/373.03 |
| 7,957,762 B2 | 6/2011 | Herz et al. | |
| 8,006,002 B2 | 8/2011 | Kalayjian et al. | |
| 8,161,417 B1* | 4/2012 | Lee ....................... | G06F 3/0487 715/802 |
| 8,239,784 B2 | 8/2012 | Hotelling et al. | |
| 8,254,904 B1* | 8/2012 | Radoshinsky ..... | H04M 1/72436 340/506 |
| 8,279,180 B2 | 10/2012 | Hotelling et al. | |
| 8,346,881 B1* | 1/2013 | Cohen ................. | H04L 47/2433 709/224 |
| 8,355,491 B1 | 1/2013 | Butt | |
| 8,355,705 B2 | 1/2013 | Kitaya | |
| 8,381,135 B2 | 2/2013 | Hotelling et al. | |
| 8,385,884 B1* | 2/2013 | Hertzfeld ............ | H04M 3/42382 455/565 |
| 8,423,049 B2* | 4/2013 | Shim ................... | H04M 1/6016 455/456.4 |
| 8,479,122 B2 | 7/2013 | Hotelling et al. | |
| 9,348,458 B2 | 5/2016 | Hotelling et al. | |
| 9,933,937 B2 | 4/2018 | Lemay et al. | |
| 2002/0015024 A1 | 2/2002 | Westerman et al. | |
| 2002/0142792 A1* | 10/2002 | Martinez ................ | H04M 1/663 455/574 |
| 2003/0138087 A1* | 7/2003 | Takeda .................. | H04W 4/12 379/207.02 |
| 2005/0008135 A1* | 1/2005 | Bressler ................ | H04M 1/57 379/142.01 |
| 2005/0130634 A1* | 6/2005 | Godfrey ................ | H04W 4/023 455/414.1 |
| 2005/0154793 A1* | 7/2005 | Khartabil ............. | H04L 65/1104 709/227 |
| 2005/0170849 A1* | 8/2005 | McClelland .......... | H04M 19/04 455/567 |
| 2005/0175158 A1 | 8/2005 | Janssen | |
| 2005/0186977 A1* | 8/2005 | Chiu ..................... | H04W 8/18 455/466 |
| 2005/0190059 A1 | 9/2005 | Wehrenberg | |
| 2005/0249023 A1* | 11/2005 | Bodlaender ........ | H04M 3/53333 365/232 |
| 2006/0017692 A1 | 1/2006 | Wehrenberg et al. | |
| 2006/0026521 A1 | 2/2006 | Hotelling et al. | |
| 2006/0033724 A1 | 2/2006 | Chaudhri et al. | |
| 2006/0099940 A1 | 5/2006 | Pfleging et al. | |
| 2006/0105800 A1* | 5/2006 | Lee ....................... | H04M 1/663 455/550.1 |
| 2006/0121887 A1 | 6/2006 | Chilukoor | |
| 2006/0195528 A1 | 8/2006 | Stroupe et al. | |
| 2006/0197753 A1 | 9/2006 | Hotelling | |
| 2007/0021108 A1* | 1/2007 | Bocking ............... | H04M 19/04 455/414.1 |
| 2007/0036347 A1* | 2/2007 | Teicher ................. | H04M 1/724 379/418 |
| 2007/0037605 A1* | 2/2007 | Logan .................. | H04M 3/42008 455/567 |
| 2007/0275767 A1* | 11/2007 | Steele .................. | H04M 19/04 455/567 |
| 2008/0039066 A1 | 2/2008 | Laroia et al. | |
| 2008/0043958 A1 | 2/2008 | May et al. | |
| 2008/0112555 A1* | 5/2008 | Johns ................... | H04M 1/642 379/207.02 |
| 2008/0139183 A1* | 6/2008 | Keohane ............. | H04M 1/72463 455/414.1 |
| 2008/0182591 A1 | 7/2008 | Krikorian | |
| 2008/0207263 A1* | 8/2008 | May ...................... | H04M 19/04 455/556.2 |
| 2008/0214161 A1* | 9/2008 | Jakl .................... | H04M 1/72457 455/414.2 |
| 2008/0280642 A1* | 11/2008 | Coxhill ................. | G06F 3/0346 340/670 |
| 2008/0298575 A1* | 12/2008 | Rondeau .............. | H04M 3/436 379/211.01 |
| 2009/0170528 A1 | 7/2009 | Bull et al. | |
| 2009/0215466 A1* | 8/2009 | Ahl .................... | H04M 1/72457 455/456.1 |
| 2009/0252303 A1 | 10/2009 | Agarwal | |
| 2009/0295562 A1* | 12/2009 | Shuster ................ | B60K 35/00 340/506 |
| 2009/0303185 A1* | 12/2009 | Larsen .............. | H04M 1/72466 345/168 |
| 2009/0305744 A1 | 12/2009 | Ullrich | |

(56) References Cited

U.S. PATENT DOCUMENTS

| | | | | |
|---|---|---|---|---|
| 2010/0004000 | A1* | 1/2010 | Chen | H04W 4/16 455/456.1 |
| 2010/0017411 | A1* | 1/2010 | Nakamura | G06F 1/329 707/E17.059 |
| 2010/0061546 | A1* | 3/2010 | Weiss | H04Q 3/72 379/418 |
| 2010/0216509 | A1 | 8/2010 | Riemer et al. | |
| 2010/0216519 | A1* | 8/2010 | Kitaya | H04W 8/183 455/567 |
| 2010/0227581 | A1* | 9/2010 | Cook | H04W 4/02 455/411 |
| 2011/0053572 | A1* | 3/2011 | Cook | H04W 4/029 455/456.2 |
| 2011/0106736 | A1* | 5/2011 | Aharonson | H04M 1/72472 706/46 |
| 2011/0119589 | A1* | 5/2011 | Alameh | G06F 3/04895 455/566 |
| 2011/0136479 | A1* | 6/2011 | Kim | H04M 1/6016 455/418 |
| 2011/0151852 | A1* | 6/2011 | Olincy | H04M 1/72436 455/418 |
| 2011/0183650 | A1* | 7/2011 | McKee | H04M 1/724 455/567 |
| 2011/0228753 | A1* | 9/2011 | Polito | H04W 52/0254 455/456.4 |
| 2011/0250871 | A1 | 10/2011 | Huang et al. | |
| 2011/0300846 | A1 | 12/2011 | Chiu et al. | |
| 2012/0036344 | A1* | 2/2012 | Hubner | H04M 1/72454 713/1 |
| 2012/0264397 | A1* | 10/2012 | Meredith | H04W 76/10 455/410 |
| 2012/0290434 | A1* | 11/2012 | Moritz | G06Q 30/0261 705/26.7 |
| 2012/0329447 | A1* | 12/2012 | Gilbert | H04M 1/72451 455/420 |
| 2013/0053073 | A1* | 2/2013 | Zhao | H04W 48/04 455/456.6 |
| 2013/0324071 | A1* | 12/2013 | Huh | H04M 3/02 455/404.1 |
| 2013/0326209 | A1* | 12/2013 | Dommalapati | H04M 1/72457 713/100 |
| 2013/0332721 | A1 | 12/2013 | Chaudhri et al. | |
| 2016/0255188 | A1 | 9/2016 | Chaudhri et al. | |
| 2022/0078277 | A1 | 3/2022 | Chaudhri et al. | |
| 2023/0185380 | A1 | 6/2023 | Chaudhri et al. | |

FOREIGN PATENT DOCUMENTS

| | | | | |
|---|---|---|---|---|
| CN | 101501713 | A | | 8/2009 |
| CN | 101715021 | A | | 5/2010 |
| EP | 1217532 | A2 | | 6/2002 |
| EP | 1379064 | A2 | | 1/2004 |
| EP | 1860526 | A1 | | 11/2007 |
| EP | 1876800 | A1 * | | 1/2008 ........ H04M 1/72572 |
| EP | 1890398 | A1 * | | 2/2008 ............ H04W 36/32 |
| EP | 2326063 | A1 | | 5/2011 |
| GB | 2426142 | A | | 11/2006 |
| JP | H11-98224 | A | | 4/1999 |
| JP | 2000-163031 | A | | 6/2000 |
| JP | 2001008258 | A * | | 1/2001 |
| JP | 2001-53831 | A | | 2/2001 |
| JP | 2002-342033 | A | | 11/2002 |
| JP | 2004-88146 | A | | 3/2004 |
| JP | 2004364061 | A * | | 12/2004 |
| KR | 20060033227 | A * | | 4/2006 |
| KR | 20060102704 | A * | | 9/2006 |
| KR | 20100006869 | A * | | 1/2010 |
| TW | 200814813 | A | | 3/2008 |
| WO | WO-2004021687 | A1 * | | 3/2004 ............ H04M 3/436 |
| WO | 2006/108288 | A1 | | 10/2006 |
| WO | 2008/101312 | A1 | | 8/2008 |
| WO | 2008131806 | A1 | | 11/2008 |
| WO | 2009/041060 | A1 | | 4/2009 |
| WO | 2013/169849 | A2 | | 11/2013 |
| WO | 2013/184530 | A1 | | 12/2013 |
| WO | 2014/105276 | A1 | | 7/2014 |

OTHER PUBLICATIONS

Examiner's Answer to Appeal Brief received for U.S. Appl. No. 15/149,013, mailed on Apr. 17, 2020, 26 pages.
Final Office Action received for U.S. Appl. No. 13/842,682, mailed on Mar. 30, 2015, 16 pages.
Final Office Action received for U.S. Appl. No. 15/149,013, mailed on Sep. 27, 2018, 17 pages.
International Search Report received for PCT Patent Application No. PCT/US2013/043792, mailed on Oct. 21, 2013, 2 pages.
Non-Final Office Action received for U.S. Appl. No. 18/167,808, mailed on Jun. 26, 2023, 14 pages.
Non-Final Office Action received for U.S. Appl. No. 13/842,682, mailed on Aug. 19, 2015, 18 pages.
Non-Final Office Action received for U.S. Appl. No. 13/842,682, mailed on Jul. 17, 2014, 16 pages.
Non-Final Office Action received for U.S. Appl. No. 15/149,013, mailed on Mar. 28, 2019, 21 pages.
Non-Final Office Action received for U.S. Appl. No. 15/149,013, mailed on Mar. 29, 2018, 14 pages.
Notice of Allowability received for U.S. Appl. No. 15/149,013, mailed on Aug. 26, 2021, 6 pages.
Notice of Allowance received for U.S. Appl. No. 13/842,682, mailed on Jan. 20, 2016, 18 pages.
Notice of Allowance received for U.S. Appl. No. 15/149,013, mailed on Jul. 8, 2021, 9 pages.
Notice of Allowance received for U.S. Appl. No. 15/149,013, mailed on May 7, 2021, 9 pages.
Notice of Allowance received for U.S. Appl. No. 17/454,983, mailed on Sep. 26, 2022, 11 pages.
Notice of Allowance received for U.S. Appl. No. 18/167,808, mailed on Nov. 6, 2023, 9 pages.
Partial European Search Report received for European Patent Application No. 13169663.5, mailed on Feb. 6, 2014, 6 pages.
Patent Board Decision received for U.S. Appl. No. 15/149,013, mailed on Feb. 4, 2021, 10 pages.
Search Report received for Chinese Patent Application No. 202010031814.7, mailed on Jan. 4, 2021, 5 pages (2 pages of English Translation and 3 pages of Official Copy).
Search Report received for Chinese Patent Application No. 202010031377.9, mailed on Jan. 12, 2023, 5 Pages (2 Pages of English Translation and 3 pages of Official Copy).
Search Report received for European Patent Application No. 13169663.5, mailed on Jun. 4, 2014, 8 pages.
Search Report received for European Patent Application No. 16188951.4, mailed on Dec. 7, 2016, 4 pages.
Search Report received for Taiwanese Patent Application No. 102120384, mailed on Dec. 8, 2014, 1 page.
Amit-Bhawani, A., "Set Silent Mode on Phone During Night Time With Silent Sleep App", Android advises, Available online at: <http://androidadvices.com/set-silent-mode-phone-night-time-silent-sleep-app/>, Mar. 12, 2012, 6 pages.
Anonymous, "Auto Ring-Farproc", Available online at: <http://wayback.archive.org/web/20120529143541/http://a.farproc.com/auto-ring>, May 29, 2012, 2 pages.
Anonymous, "How might We Help People Auto Silent their Mobile Phone by Using the Position on GPS?", Available Online at: <http://reportdd.com/information-technologyhow-might-we-help-people-auto-silent-their-mobile-phone-by-using-the-position-on-gps.html>, Jul. 12, 2010, 2 pages.
Anonymous, "Llama—Location Profiles", Android Market, Kebabapps, Available online at: <http://wayback.archive.org/web/20111018050500/https://market.android.com/details?id=com.kebab.Llama>, Oct. 18, 2011, 3 pages.
Anonymous, "Samsung Galaxy S GT-I9000 quick start guide", Samsung Electronics, Retrieved from the Internet: URL: http://

(56) References Cited

OTHER PUBLICATIONS downloadcenter.samsung.com/content/EM/201007/20100716085606250/GT-I9000_QSG_EU_Eng_Rev.1.1_100715.pdf, Jul. 2010, 57 pages.
Anonymous, "Silent Time", Quite Hypnotic, Android Apps on Google Play. Available online at: <https://play.google.com/store/apps/details/id=com.QuiteHypnotic.SilentTime>, May 6, 2012, 3 pages.
Bigbadaboom, "Silent Sleep-Android Apps on Google Play", Available online at: <https://play.google.com/store/apps/details?id=com.boom.silentsleep&hl=en>, May 13, 2010, 2 pages.
Gordon, W., "Llama Automates Nearly Any Setting on Your Android Phone", Available online at: <http://lifehacker.com/5800147/llama-automates-nearly-any-setting-on-your-android>, May 9, 2011, 2 pages.
Lee et al., "A Multi-Touch Three Dimensional Touch-Sensitive Tablet", CHI'85 Proceedings, Apr. 1985, pp. 21-25.
Rubine, Dean, "Combining Gestures and Direct Manipulation", CHI'92, May 3-7, 1992, pp. 659-660.
Rubine, Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Sentersix, "Safe Driver-Android Apps on Google Play", Available online at: <https://play.google.com/store/apps/details?id=com.sentersix.safedriver.android&hl=en>, Sep. 16, 2011, 2 pages.
Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.
Siewiorek et al., "SenSay: A Context-Aware Mobile Phone", ISWC, 2003, Retrieved online. [URL: https://www.cs.cmu.edu/~aura/docdir/sensay_iswc.pdf], Oct. 21, 2003, 10 pages.

* cited by examiner

QUIET HOURS FOR NOTIFICATIONS

CROSS REFERENCE TO RELATED APPLICATIONS

This application is a continuation of U.S. patent application Ser. No. 18/167,808, filed Feb. 10, 2023 (now U.S. Publication No. 2023-0185380 A1), which is a continuation of U.S. patent application Ser. No. 17/454,983, filed Nov. 15, 2021 (now U.S. Pat. No. 11,582,342, issued on Feb. 14, 2023), which is a continuation of U.S. patent Application Ser. No. 15/149,013, filed May 6, 2016 (now U.S. Pat. No. 11,178,271, issued on Nov. 16, 2021), which is a continuation of U.S. patent application Ser. No. 13/842,682, filed Mar. 15, 2013 (now U.S. Pat. No. 9,348,607, issued on May 24, 2016), which claims the benefit under 35 U.S.C. § 119(e) of U.S. Provisional Patent Application No. 61/656,935, filed Jun. 7, 2012, the contents of which are incorporated by reference herein in their entireties for all intended purposes.

TECHNICAL FIELD

The disclosure generally relates to mechanisms for providing notifications on a computing device.

BACKGROUND

Computing devices often provide notifications for events that occur on or are detected by the computing device. For example, a computing device that has telephony capability can provide a ringer notification that informs the user of an incoming telephone call. A scheduled meeting on a calendar application can trigger a notification reminding the user of a meeting. An incoming text message or email can trigger a notification that notifies the user of the new message or email. These notifications can be presented to the user by sound, movement (e.g., vibration) and/or light (e.g., a graphical notification on an illuminated display).

Sometimes these notifications occur when a user does not wish to be disturbed. For example, a telephone call notification (e.g., a ringer, a graphical notification, or vibration) during a meeting can be disruptive to the participants of the meeting. A text message or email notification while the user is sleeping can impede restful sleep. Common approaches for avoiding these types of disruptions are to allow the user to manually turn off the ringer and/or sound of the computing device or to turn off the computing device itself. However, these approaches require that the user remember to manually turn on or off the ringer or device when the user does not want to be disturbed.

SUMMARY

In some implementations, a computing device can be configured to automatically turn off notifications when generating a notification would cause a disturbance or may be unwanted by a user. The device can be configured with quiet hours during which notifications that would otherwise be generated by the computing device can be suppressed. In some implementations, quiet hours can be configured as a time period with a start time and an end time. In some implementations, quiet hours can be derived from application data. For example, calendar data, alarm clock data, map data, sensor data, etc. can be used to determine when quiet hours should be enforced. In some implementations, the device can be configured with exceptions to quiet hour notification suppression. For example, the user can identify contacts to which quiet hours notification suppression should not be applied.

Particular implementations provide at least the following advantages: Notifications on a computing device can be automatically suppressed reducing the number of unwanted disturbances experienced by a user of the computing device. According to some implementations, the user does not have to remember to turn on or off notifications.

Details of one or more implementations are set forth in the accompanying drawings and the description below. Other features, aspects, and potential advantages will be apparent from the description and drawings, and from the claims.

DESCRIPTION OF THE DRAWINGS

Like reference symbols in the various drawings indicate like elements.

DETAILED DESCRIPTION

This disclosure describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radial buttons, checkboxes and any other mechanism for receiving input from, or providing feedback to a user.

When the disclosure refers to "scroll" or "scrolling" a GUI, these terms are understood to include manipulating the GUI with a mouse or other input device, or touching, tapping or gesturing with one or more fingers or stylus on a user interface to cause the GUI to appear to scroll. For example, a user can provide input to a user interface elements (e.g., virtual buttons, switches, sliders, scrubbers, knobs, buttons and any other mechanism) to cause the GUI to scroll.

Quiet Hours—Manual Setting

Figure 1A:
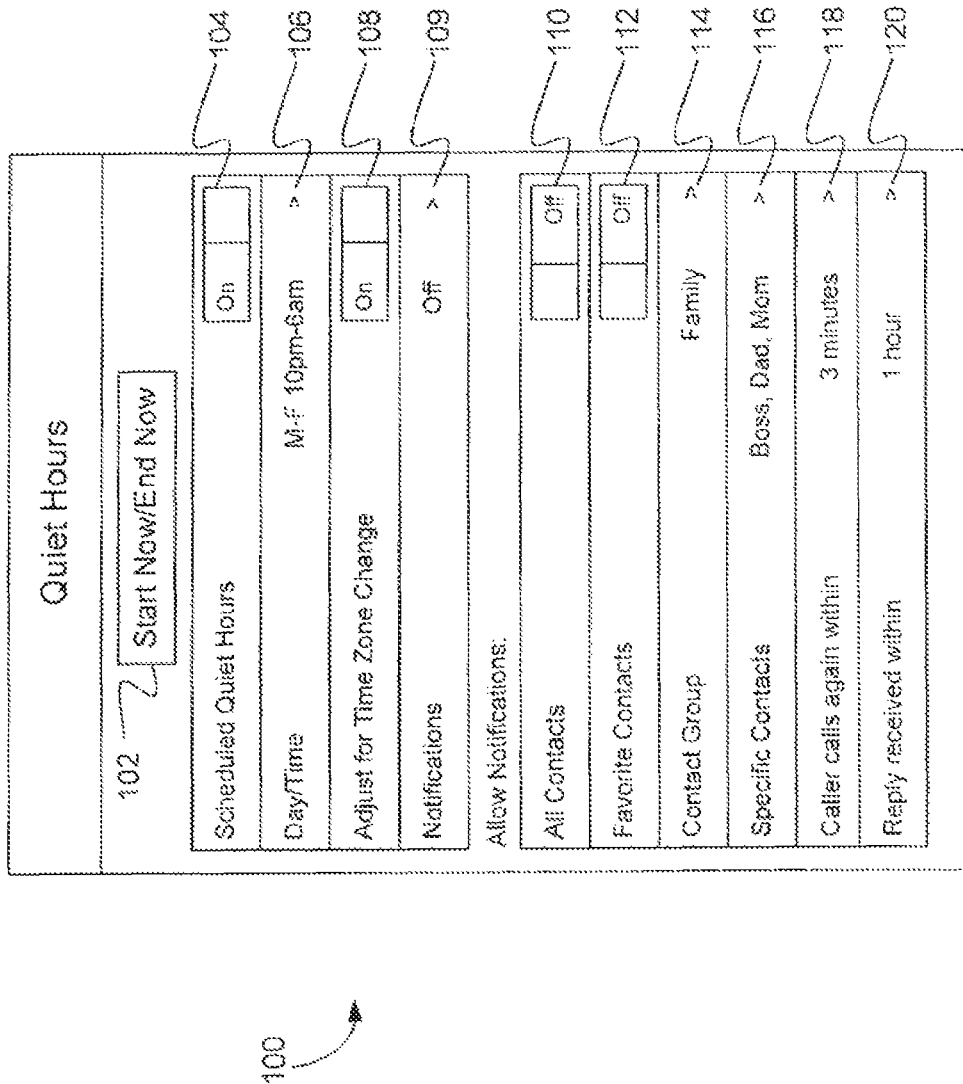
FIGS. 1A and 1B illustrate example graphical user interface for configuring quiet hours on a computing device.
Figure 1B:
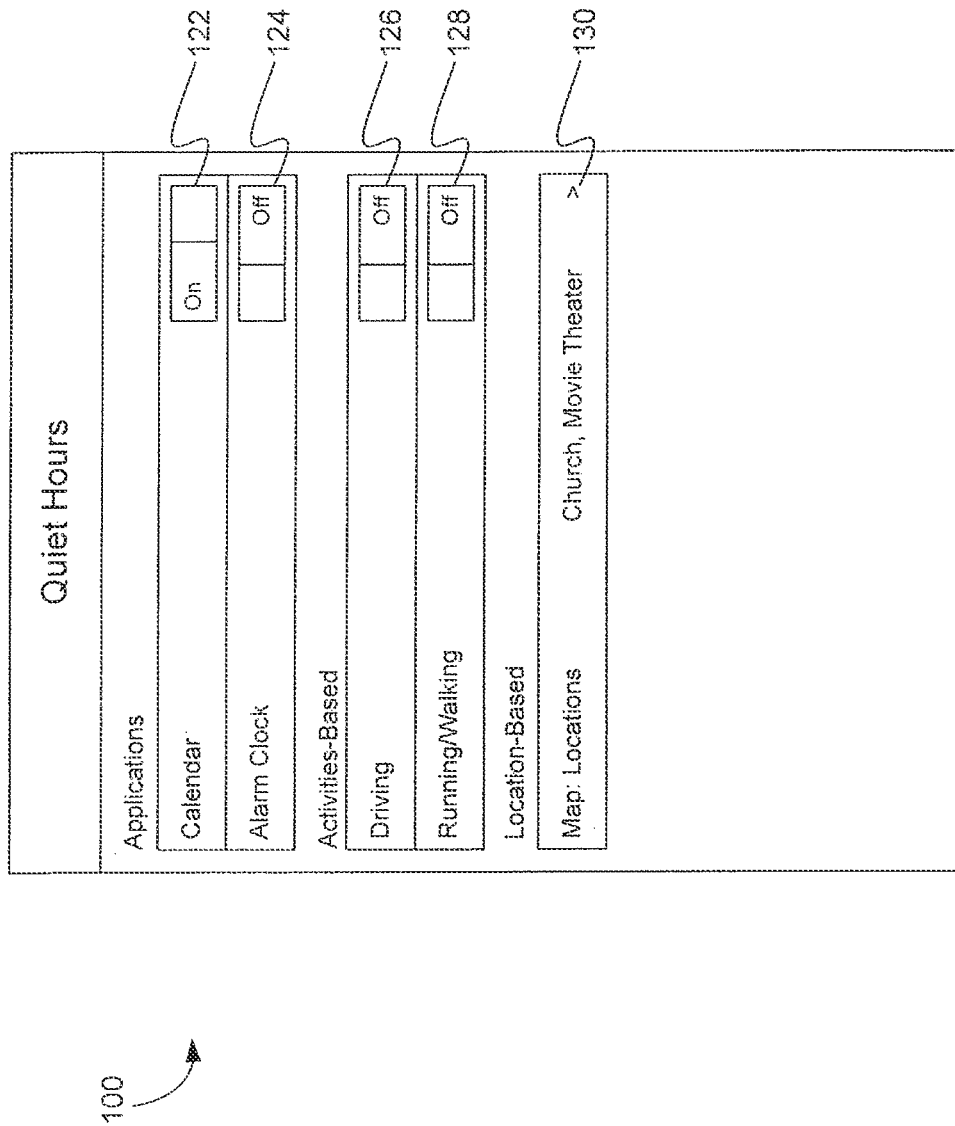

FIGS. 1A and 1B illustrate example graphical user interface 100 for configuring quiet hours on a computing device. For example, a user can scroll graphical user interface 100 to display the graphical elements of FIGS. 1A and 1B. Graphical user interface 100 can be accessed by selecting a system settings function of the computing device, for example.

In some implementations, graphical user interface 100 can include graphical element 102 for initiating and/or terminating quiet hours on the computing device. For example, a user can select graphical element 102 to manually initiate quiet hours on the computing device. During quiet hours, notifications that would normally be generated by the computing device can be suppressed. For example, when the computing device detects an event (e.g., incoming telephone call, text message, email, calendar event, etc.) during quiet hours that would normally trigger a notification that causes the computing device to generate a sound (e.g., a ringer), cause movement (e.g., vibration), or present a graphical notification (e.g., illuminate the display of the mobile device), the sound, movement or illumination can be suppressed. A user can terminate quiet hours by selecting graphical element 102. For example, graphical element 102 can function as an on/off toggle such that when quiet hours is turned off, selection of graphical element 102 turns quiet hours on and when quiet hours is turned on, selection of graphical element 102 turns quiet hours off.

Quiet Hours—Automatic/Scheduled Setting

In some implementations, quiet hours can be automatically initiated and terminated based on a user-defined schedule. For example, graphical user interface 100 can include graphical element 104 (e.g., a switch) for turning on/off scheduled quiet hours. In some implementations, a user can specify what types of notifications can be received during quiet hours, for example, SMS text messages may be blocked while email messages are allowed to generate a notification. In some implementations, a user can specify a period of time during which quiet hours are active. For example, graphical element 106 can be selected to present an interface (not shown) for specifying which days of the week to observe quiet hours and the time period (e.g., start time and end time) during which quiet hours should be enforced on the selected days. For example, a user can specify that quiet hours should be enforced between 9 pm and 7 am on weekdays (e.g., Monday-Friday).

In some implementations, quiet hours can be adjusted based on time zones. For example, graphical user interface 100 can include a switch 108 for turning on/off automatic time zone adjustments to the quiet hours schedule. For example, if the computing device is moved from the Pacific Time Zone to the Central Time Zone, the quiet hours schedule can be automatically adjusted to account for the time difference. In some implementations, if automatic time zone adjustment for quiet hours is turned off, the user can be prompted to adjust the quiet hours schedule based on movement of the computing device. For example, if the user travels with the computing device from San Francisco, CA to Denver, CO and automatic time zone adjustment is turned off, the device can present a graphical notification (not shown) asking the user if the user would like the quiet hours schedule to be adjusted to Denver (Central) time. The user can provide input to the graphical notification to cause the quiet hours schedule to be adjusted to Central Time or can provide input to maintain the quiet hours schedule according to Pacific Time.

In some implementations, graphical user interface 100 can include graphical element 109 for specifying types of notifications (e.g., sound, vibration, illumination, none) that are allowed during quiet hours. If the user specifies that notifications by illumination (e.g., illuminate the display of the computing device and present a graphical notification) are allowed then notifications that would normally cause a sound or vibration will merely cause an illumination of the display and a presentation of a graphical notification. If the user specifies that no notifications are allowed, then all notifications will be suppressed; no sound, vibration and/or illumination will be generated by the mobile device in response to a detected event.

Quiet Hours Exceptions

In some implementations, a user can configure the computing device to allow notifications during quiet hours. For example, graphical user interface 100 can include graphical element 110 (e.g., a switch) for turning on/off a quiet hours exception for contacts in the user's address book. If graphical element 110 is in the "on" state, events (e.g., telephone call, text message, email, etc.) associated with a contact in the user's contacts database (e.g., address book) will generate a notification during quiet hours. Notifications that are not associated with a contact in the user's contacts database or address book will be suppressed according to normal quiet hours operation. Similarly, quiet hours exceptions for favorite contacts can be turned on by selecting graphical element 112. For example, a user can specify a group of favorite contacts in the user's contacts database.

Graphical user interface 100 can include graphical element 114 for identifying contact groups in the user's address book that qualify for a quiet hours exception. For example, a user can generate groups of contacts (e.g., work, family, softball team, favorites, VIP, etc.) in the user's address book. The user can select graphical element 114 to view and select one or more contact groups for which a quiet hours exception should apply. If an event associated with a member of a selected contact group is detected and generates a notification during quiet hours, the notification from the selected group will not be suppressed. Similarly, quiet hours exceptions for specific or individual contacts can be specified by selecting graphical element 116.

In some implementations, a quiet hours exception can be based on the urgency of an event. For example, the urgency of an event can be inferred by how soon the event is repeated. Graphical element 118 can be selected by the user to specify a threshold period of time by which the urgency of an event can be determined. For example, a user can select graphical element 110 and specify a time period of three minutes. Thus, if two telephone calls, text messages, emails, etc., are received during quiet hours from the same caller within a three minute period, the second call can cause a notification (e.g., sound, movement, illumination) to be generated by the computing device.

In some implementations, a quiet hours exception can be inferred from prior user activity on the computing device. For example, if during quiet hours the user initiates a phone call, text message, email, or other communication to a particular person, a reply communication from the particular person can be allowed to generate a notification on the computing device. In some implementations, the reply exception can be subject to a window of time during which the reply exception will apply. For example, if the reply communication from the particular person is received within an hour, the reply exception can apply and a notification can be generated. If the reply communication is received three hours after the user-initiated communication, then the reply communication from the particular person can be suppressed. The reply threshold can be specified by the user by selecting graphical element 120.

Automatically Enabling Quiet Hours for Application Events

Referring to FIG. 1B, graphical user interface 100 can include graphical element 122 for turning on/off quiet hours for calendar events. For example, a user can select graphical element 122 to cause quiet hours to be automatically enabled for calendar events (e.g., meetings, appointments, etc.) or based on other calendar data (e.g., office hours). For example, when a meeting event is generated for a calendar application on the computing device, quiet hours can be automatically enabled for the duration of the meeting event so that the user will not receive notifications during the meeting. In some implementations, a user may select individual calendar events to cause quiet hours to be enabled, such that some, but not all, calendar events suppress notifications.

In some implementations, if the calendar application has information that specifies office hours (e.g., working hours) for the user, quiet hours can be enabled such that work related notifications will be suppressed during non-working hours and/or non-work related notifications will be suppressed during working hours. For example, if an email is received from a work email account during non-working hours, the work email notification can be suppressed. Similarly, if an email is received from a non-work email account during working hours, the non-work email notification can be suppressed. Telephone calls, text messages and other communication notifications can be handled in a similar manner.

In some implementations, graphical user interface 100 can include graphical element 124 for turning on quiet hours for alarm clock events. For example, a user can select graphical element 124 to cause quiet hours to be automatically enabled for alarm clock events. In some implementations, quiet hours can be automatically enabled when the user sets an alarm in an alarm clock application and automatically disabled when the alarm goes off. In some implementations, quiet hours can be automatically disabled if the user starts using the computing device after the alarm is set. For example, if the user sets the alarm to wake the user up in the morning at 8 am but the user starts using the computing device at 7 am, quiet hours can be disabled at 7 am based on the use of the computing device.

Automatically Enabling Quiet Hours Based on Movement

In some implementations, quiet hours can be enabled/disabled based on movement of the mobile device. For example, sensors on the mobile device can detect the speed at which the mobile device is moving and determine a corresponding activity. If the device is moving at three miles per hour, the device can determine that the user is walking. If the device is moving at six miles per hour, the device can determine that the user is running. If the device is moving at twenty miles per hour, the device can determine that the user is driving or riding in a motor vehicle.

In some implementations, graphical user interface 100 can include graphical element 126 for enabling quiet hours while the user is driving or riding in a car. For example, a user may want to reduce the number of distractions while driving and/or reduce the temptation to use the computing device while driving. Thus, a user can cause the mobile device to automatically suppress notifications while driving by selecting graphical element 126.

In some implementations, graphical user interface 100 can include graphical element 128 for enabling quiet hours while the user is running or walking. For example, a user may not want to be bothered with notifications while exercising. The user may be listening to music while walking and/or running and may be annoyed by notifications interrupting the user's workout or enjoyment of music. Thus, a user can cause the mobile device to suppress notifications while walking and/or running by selecting graphical element 128.

In some embodiments, a detection that the device is not moving may be used to activate quiet hours and suppress notifications. For example, a user may place their mobile device on a nightstand or desk before sleep—a detection that the mobile device is not moving can be used as an indication that notifications should be suppressed. In other embodiments, a detection that the mobile device has not been moving for a predetermined period of time may similarly indicate that a user has placed the mobile device in a fixed position and that notifications should be suppressed.

Automatically Enabling Quiet Hours for Locations

In some implementations, quiet hours can be enabled/disabled based on a location. For example, if the user attends church, the user may wish to suppress notifications while at church. If the user likes to go to the movies, the user may wish to suppress notifications while at the movie theater. When the user is proximate to a designated location, quiet hours can be enabled. For example, proximity can be based on the current location of the mobile device as determined by using any of a variety of location determination technologies, including global navigation satellite systems, dead-reckoning, geofencing and/or other location determination technologies. When the user moves away from a designated location, quiet hours can be disabled. Thus, in some implementations, graphical user interface 100 can include graphical element 130 for identifying locations where quiet hours should be enforced, as described further below with reference to FIGS. 2A and 2B.

Figure 2A:
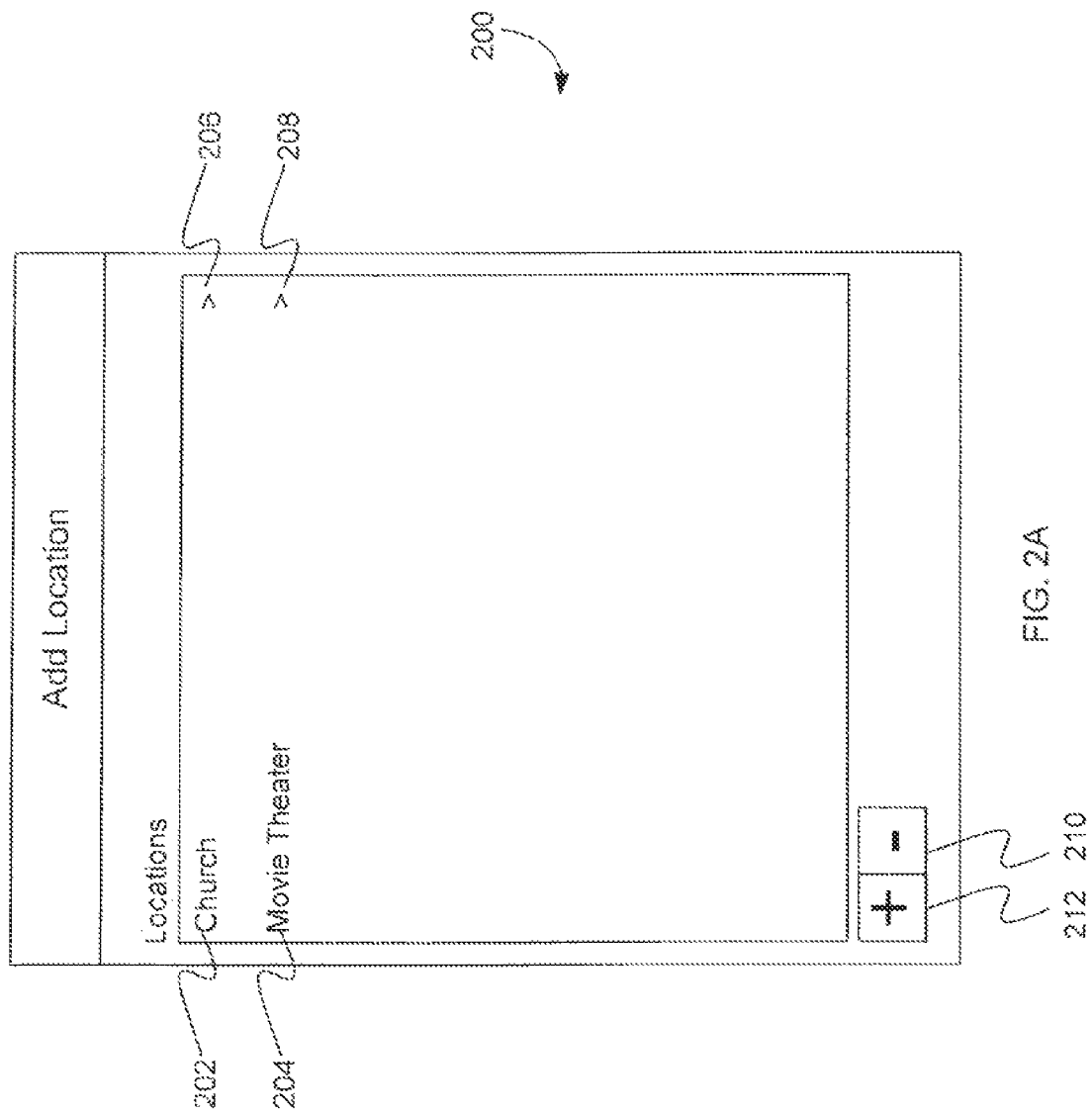
FIGS. 2A and 2B illustrate example graphical user interfaces for configuring a location for quiet hours.
Figure 2B:
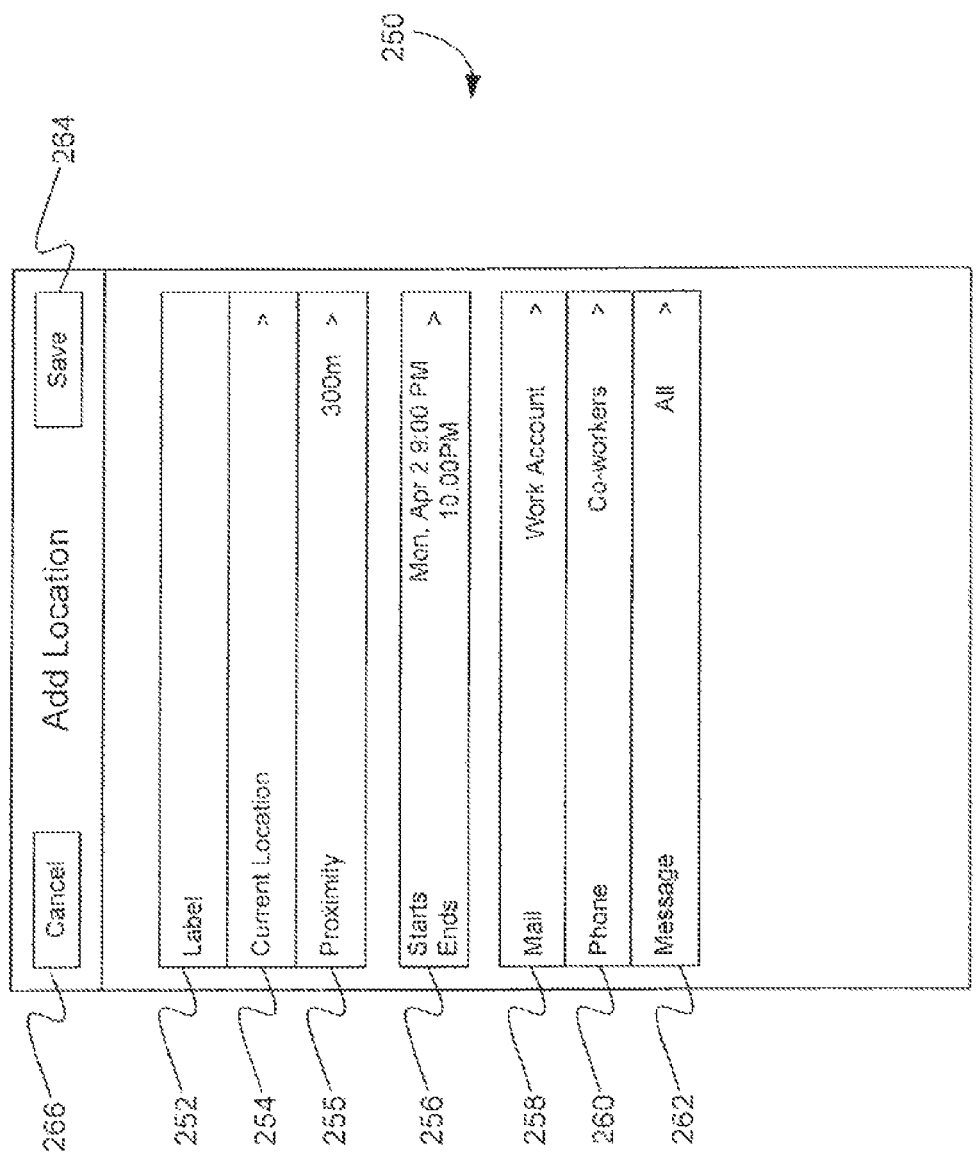

FIGS. 2A and 2B illustrate example graphical user interfaces 200 and 250 for configuring a location for quiet hours. In some implementations, graphical user interface 200 can be presented in response to a user selecting graphical element 130 of FIG. 1B. Graphical user interface 200 can include a listing of locations 202, 204 that have been configured for quiet hours. In some implementations, a user can select graphical element 206 or 208 to view and edit information corresponding to locations 202 and 204, respectively. In some implementations, a user can delete a location from the list of locations by selecting graphical element 210. For example, a user can select location 202 and then select graphical element 210 to delete the location. Alternatively, on a touch-screen device, a user can slide or swipe a finger across the location to cause a delete button to be displayed. The user can then select the delete button to delete the location from the list of locations. In some implementations, a new location can be configured for quiet hours by selecting graphical element 212.

In some implementations, graphical user interface 250 of FIG. 2B can be presented in response to a user selecting graphical element 206 or 208. If graphical user interface 250 is presented in response to a selection of graphical element 206 or 208, graphical user interface 250 can be populated with data configured for the location corresponding to graphical element 206 or 208 so that the user can edit the data. Graphical user interface 250 can then be used to edit or modify the data (e.g., parameters) for the location. If graphical user interface 250 is presented in response to a selection of graphical element 212, the graphical user interface 250 can be populated with default information. The default information can then be modified to specify quiet hours parameters for the new location.

In some implementations, graphical user interface 250 can include graphical element 252 for receiving text specifying a label for the location. For example, graphical element 252 can be a text input box and the user can type in a name or label for a location. Graphical user interface can include graphical element 254 for specifying a geographic location. For example, graphical element 254 can specify the current location of the mobile device as the default location. If the user selects graphical element 254, the user can enter an address specifying to the geographic location where quiet hours should be enforced. Alternatively, when the user selects graphical element 254, a map interface (not shown) can be displayed and the user can select or otherwise identify a geographic location on the map where quiet hours should be enforced. Graphical user interface 250 can include graphical element 255 for specifying proximity. For example, the user can select a graphical element 255 to specify a proximity, distance, or radius about the location within which quiet hours should be enforced. The user-specified geographic location can then be displayed on graphical element 254.

In some implementations, graphical user interface. 250 can include graphical element 256 for specifying quiet hours start and end times for a location. For example, if a user attends church services between 8 am and 10 am on Sunday and works at the church at other times, the user may wish to have quiet hours enforced during the church services but allow notifications during other times when the user is at the church location. In some implementations, quiet hours can be enforced at a specified location at all times. For example, the default value for graphical element 256 can be "all" or some other indication that quiet hours is always enforced at the specified location. The user can then change the default value to a specified time period if the user wants quiet hours enforced only during a particular time period. The specified time period can be a recurring time period. For example, the recurring time period can be Monday through Friday, 8 am to 6 pm.

In some implementations, quiet hours at a specified location can be enforced selectively based on characteristics of an event that triggers a notification. For example, characteristics can include who caused the event (e.g., a contact), a communication mechanism (e.g., an email account) or any other characteristic. In some implementations, graphical element 258 can be used to specify email accounts that should be excepted from quiet hours enforcement. For example, a user can add a work location to the locations where quiet hours should be enforced but specify using graphical element 258 that email received from a work account should generate notifications during quiet hours at the work location. Similarly, a user can specify quiet hours for a home location and specify an exception allowing email from a personal account to trigger notifications. Thus, a user can specify what types of emails the user will receive notifications for at specific locations. Similarly, telephone notifications can be configured by selecting graphical element 260 for a specified quiet hours location such that only telephone calls from specified contacts (e.g., individuals, groups, etc.) will generate notifications at a specified location. Text messages exceptions can be configured for a quiet hours location in a similar manner as email and telephone by selecting graphical element 262. Once the user has configured the location with the quiet hours location parameters described above, the user can select graphical element 264 to save the quiet hours location configuration. The user can select graphical element 266 to exit or close graphical user interface 250 without saving any changes. Once the new location is saved, the location can be displayed in graphical user interface 200 of FIG. 2A.

Enabling Quiet Hours in Applications

In some implementations, quiet hours can be configured within applications. For example, a calendar application can enable quiet hours for a time period corresponding to a scheduled meeting. A clock application can enable quiet hours for a time period corresponding to a sleep/wake schedule.

Calendar Events

Figure 3:
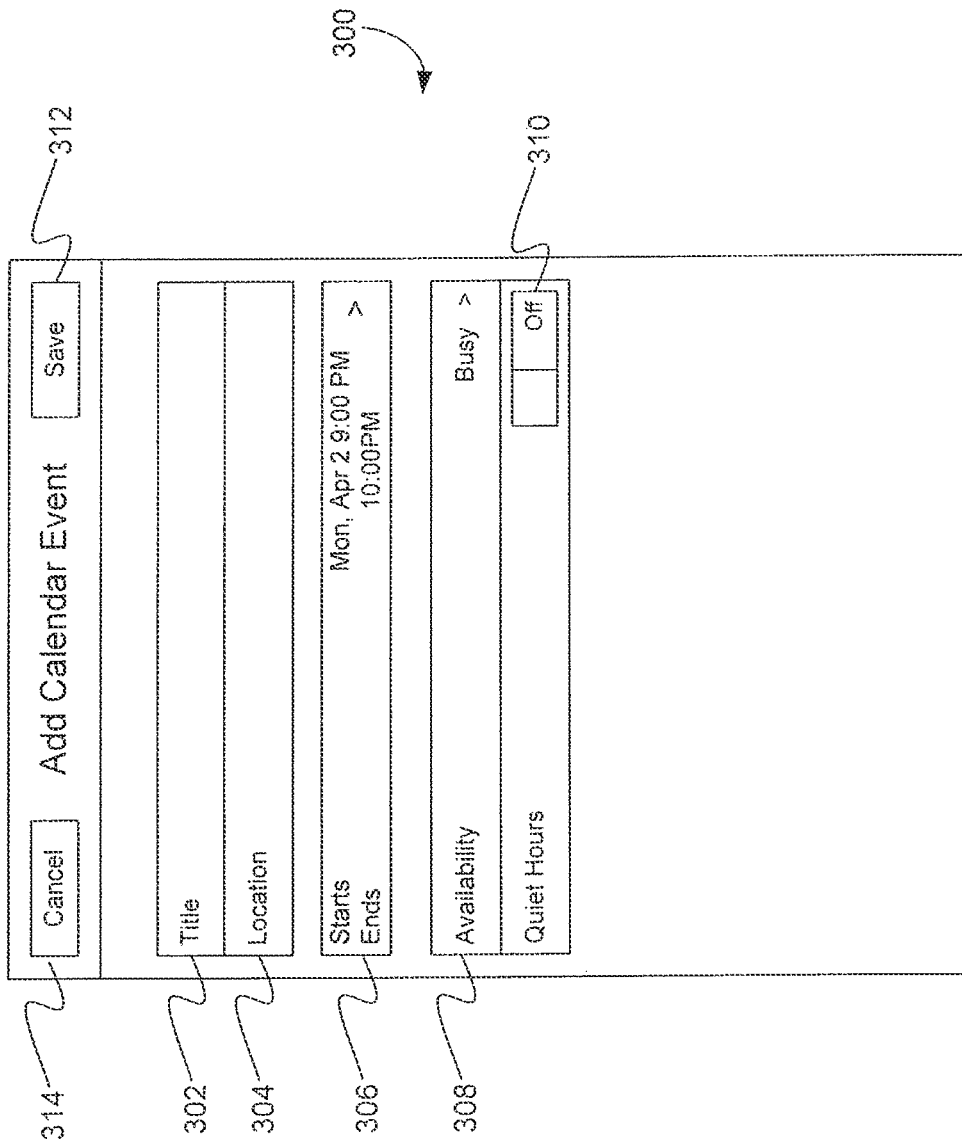
FIG. 3 illustrates an example graphical user interface for configuring quiet hours for a calendar event.

FIG. 3 illustrates an example graphical user interface 300 for configuring quiet hours for a calendar event. For example, a user can invoke graphical user interface 300 from within a calendar application by providing input indicating that the user wants to generate a new calendar event (e.g., meeting, appointment, etc.). Graphical user interface 300 can include graphical element 302 for specifying a title for the calendar event. For example, graphical element 302 can be a text box for entering a title for the calendar event.

Graphical user interface 300 can include a graphical element 304 for specifying a location associated with the calendar event. For example, the location can be an ad hoc description of the location, an address or a name that corresponds to a contact in the user's address book or contacts list. In some implementations, if quiet hours are turned on for a calendar event, quiet hours will be enforced only if the user or computing device is at the location associated with the calendar event. Thus, if the user misses the appointment or meeting, the user will still get notifications on the computing device even though quiet hours has been turned on for the time period of the calendar event.

Graphical user interface 300 can include graphical element 306 for specifying start and end times for the calendar event. For example, a user can select graphical element 306 to invoke a graphical user interface (not shown) for specifying start and end times for the calendar event.

Graphical user interface 300 can include graphical element 308 for specifying the user's availability during the calendar event. For example, a user can specify that the user will be available or busy. In some implementations, quiet hours can be enabled for the duration of the calendar event based on the specified availability of the user. For example, if the user selects graphical element 308 and selects 'busy' as the user's availability for the duration of the calendar event, quiet hours can be enforced based on the 'busy' availability selection. Alternatively, if the user selects graphical element 308 and selects 'free' or 'available' as the availability selection, then quiet hours will not be enforced during the calendar event.

Graphical user interface 300 can include graphical element 310 for turning on/off quiet hours for a calendar event. For example, if quiet hours has been enabled for calendar events using the system settings of graphical user interface 100, then when a new calendar event is generated graphical element 310 can default to 'on.' The user can select graphical element 310 to toggle quiet hours to 'off' for the new calendar event if the user does not want quiet hours enforced for the new calendar event. If quiet hours has not been previously enabled for calendar events (e.g., through the system settings of graphical user interface 100), the user can select graphical element 310 to enable quiet hours for the new calendar event. Quiet hours can then be enforced for the duration of the calendar event.

Alarm Clock Events

Figure 4:
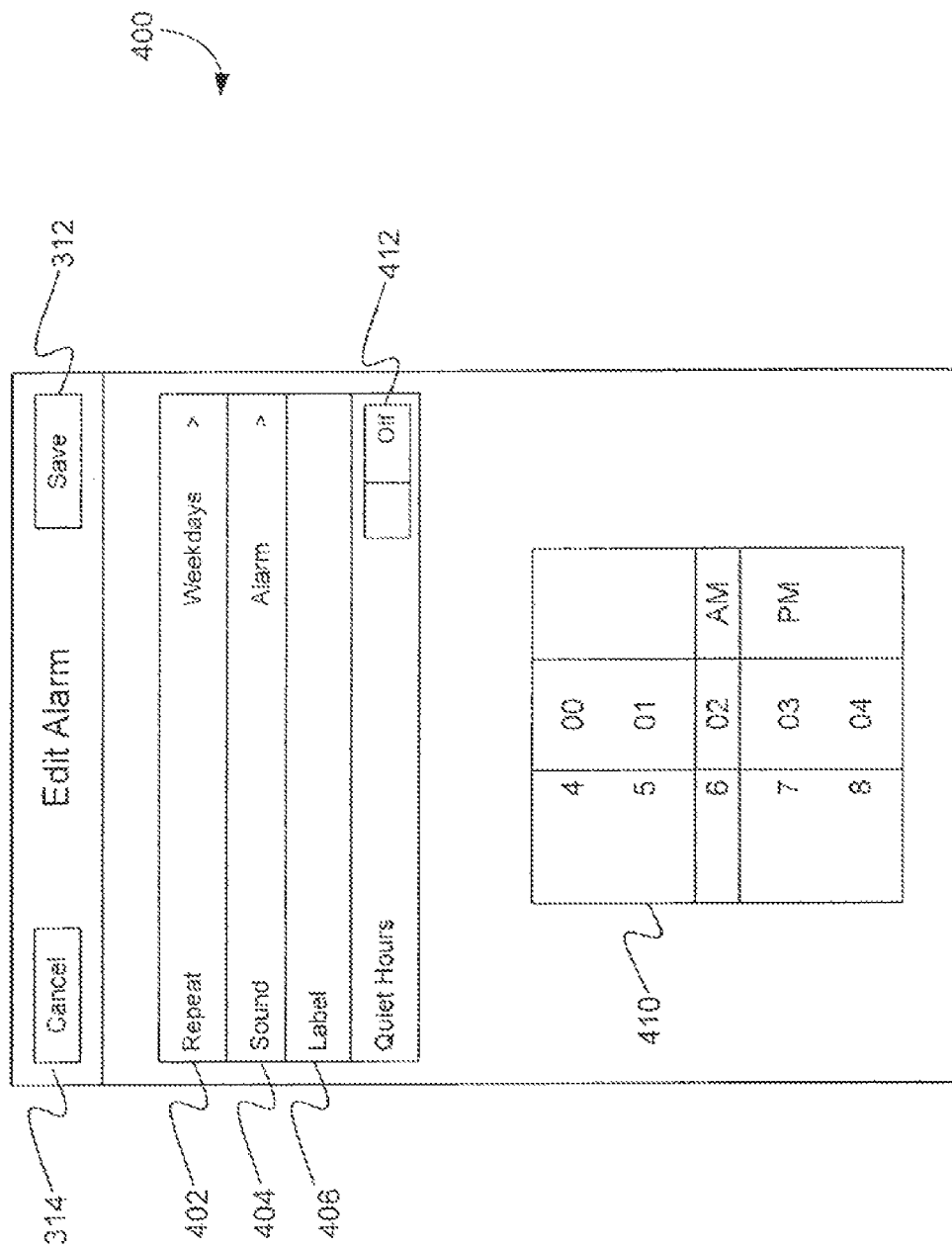
FIG. 4 illustrates an example graphical user interface for configuring quiet hours for an alarm clock event.

FIG. 4 illustrates an example graphical user interface 400 for configuring quiet hours for an alarm clock event. Graphical user interface 400 can include graphical element 402 for specifying when to repeat the alarm (e.g., every day, weekdays, Mondays, etc.). Graphical element 404 can be selected to invoke an interface (not shown) that allows the user to select a type of sound associated with the alarm. Graphical element 406 allows the user to specify a label for the alarm. For example, the user can enter text for the label. A user can interact with graphical element 410 to specify a time at which the alarm should sound. For example, graphical element 410 can include scrollable numbers for setting hours and minutes and a scrollable element for specifying AM or PM.

Graphical user interface 400 can include graphical element 412 for enabling/disabling (e.g., turning on/off) quiet hours for the alarm clock event. For example, if quiet hours has been enabled for alarm clock events using the system settings of graphical user interface 100, then when a new alarm clock event is generated graphical element 412 can default to 'on' and quiet hours can be enforced from the time when the alarm is turned on to the time the alarm sounds (goes off). The user can select graphical element 310 to toggle quiet hours to 'off' for the new alarm clock event if the user does not want quiet hours enforced for the new alarm clock event. If quiet hours has not been previously enabled for alarm clock events (e.g., through the system settings of graphical user interface 100), the user can select graphical element 310 to enable quiet hours for the new alarm clock event. Quiet hours can then be enforced for the duration of the calendar event.

In some implementations, quiet hours can be automatically enabled (turned on, enforced) when a clock alarm is turned on and automatically disabled when the clock alarm sounds. For example, a user can set the alarm to wake the user at 6 am in the morning. Quiet hours can be automatically enforced when the user turns on the clock alarm at night and quiet hours enforcement can automatically terminate when the alarm goes off or sounds in the morning. In some implementations, the user can be prompted to turn quiet hours on when the user generates a new alarm clock event. For example, if the system settings indicate the quiet hours is turned off for alarm clock events, the user can be prompted to turn on quiet hours for a new alarm clock event when the alarm clock event is generated.

Implying Quiet Hours Based on Patterns of Use

In some implementations, quiet hours can be enabled and/or enforced based on observed user patterns. For example, the computing device can monitor when the user turns quiet hours on or off on the computing device and correlate this activity to movement, location, application data or other data available to the computing device. For example, if the user repeatedly mutes or turns off the computing device during meetings scheduled in the user's calendar, the computing device can correlate the action of muting or turning off the computing device to the calendar event and automatically determine that the device should enter quiet hours during meetings. The device can enable or disable quiet hours automatically or present a prompt asking the user if the user wishes to enter into quiet hours mode. Similarly, if a user repeatedly mutes or turns off the computing device while at a particular location and/or at a particular time, the computing device can correlate the user's action (e.g., mute, turn off the device) to the particular location and/or time. The computing device can then automatically enter quiet hours when the user is at the particular location and/or at the particular time.

Example Quiet Hours Indicator

Figure 5:
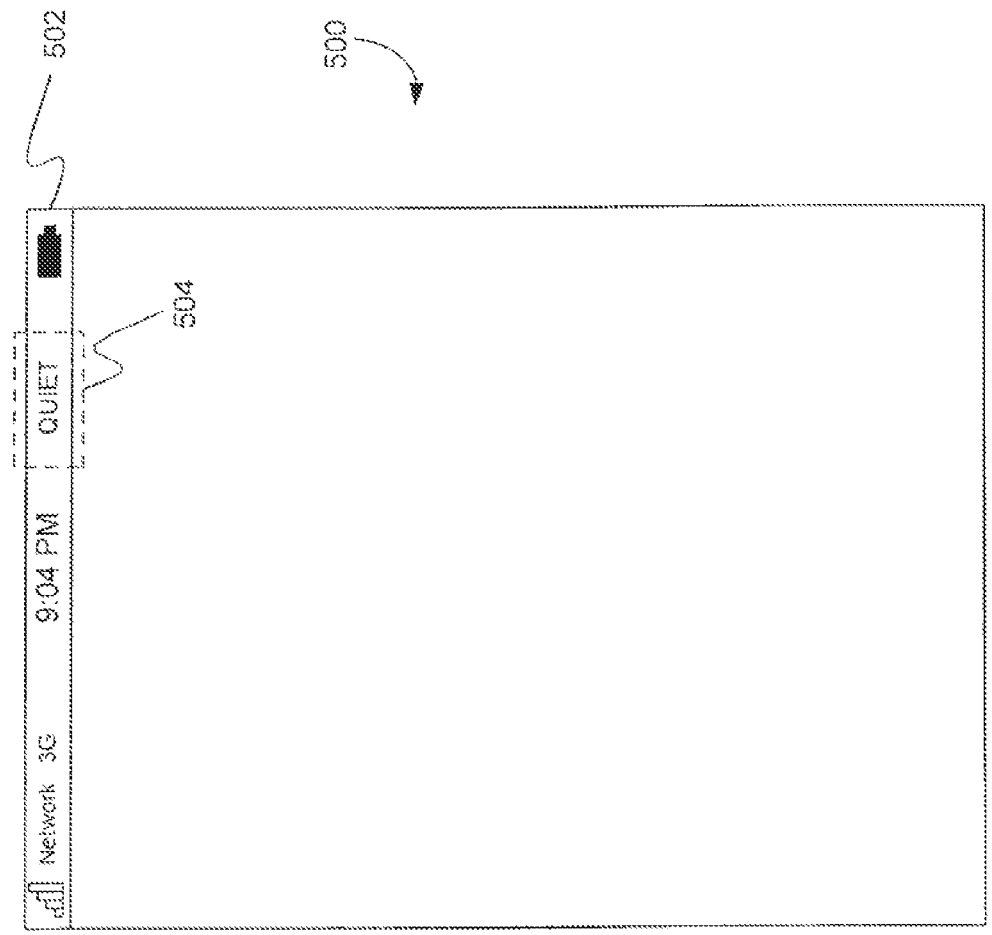
FIG. 5 illustrates an example graphical user interface with a quiet hours indicator.

FIG. 5 illustrates an example graphical user interface 500 with a quiet hours indicator. Graphical user interface 500 can include information area 502 for displaying status information for the computing device. For example, information area 502 can include signal strength information, telecommunications carrier information, the current time and/or battery status information. In some implementations, information area 502 can include quiet hours indicator 504. For example, quiet hours indicator 504 can include text, symbols, icons or any other type of graphical elements for indicating that quiet hours are currently enforced (e.g., turned on) on the computing device. In some implementations, the quiet hours indicator can be displayed on portions of graphical user interface 500 other than information area 502.

Voice Activation

In some implementations, quiet hours can be enabled by voice command. For example, the user can speak a command (e.g., "enable quiet hours" or "start quiet hours") to enable quiet hours on the computing device. The computing device can include a microphone to detect the spoken command. In response to detecting the spoken command, the computing device can enable quiet hours on the computing device. The computing device can respond to other quiet hours voice commands. For example, a user can speak a command such as "do not disturb for the next three hours" to enable quiet hours for the next three hours. The computing device can detect and process voice commands to enable any of the quiet hours functions discussed herein with reference to FIGS. 1-6.

Example Quiet Hours Process

Figure 6:
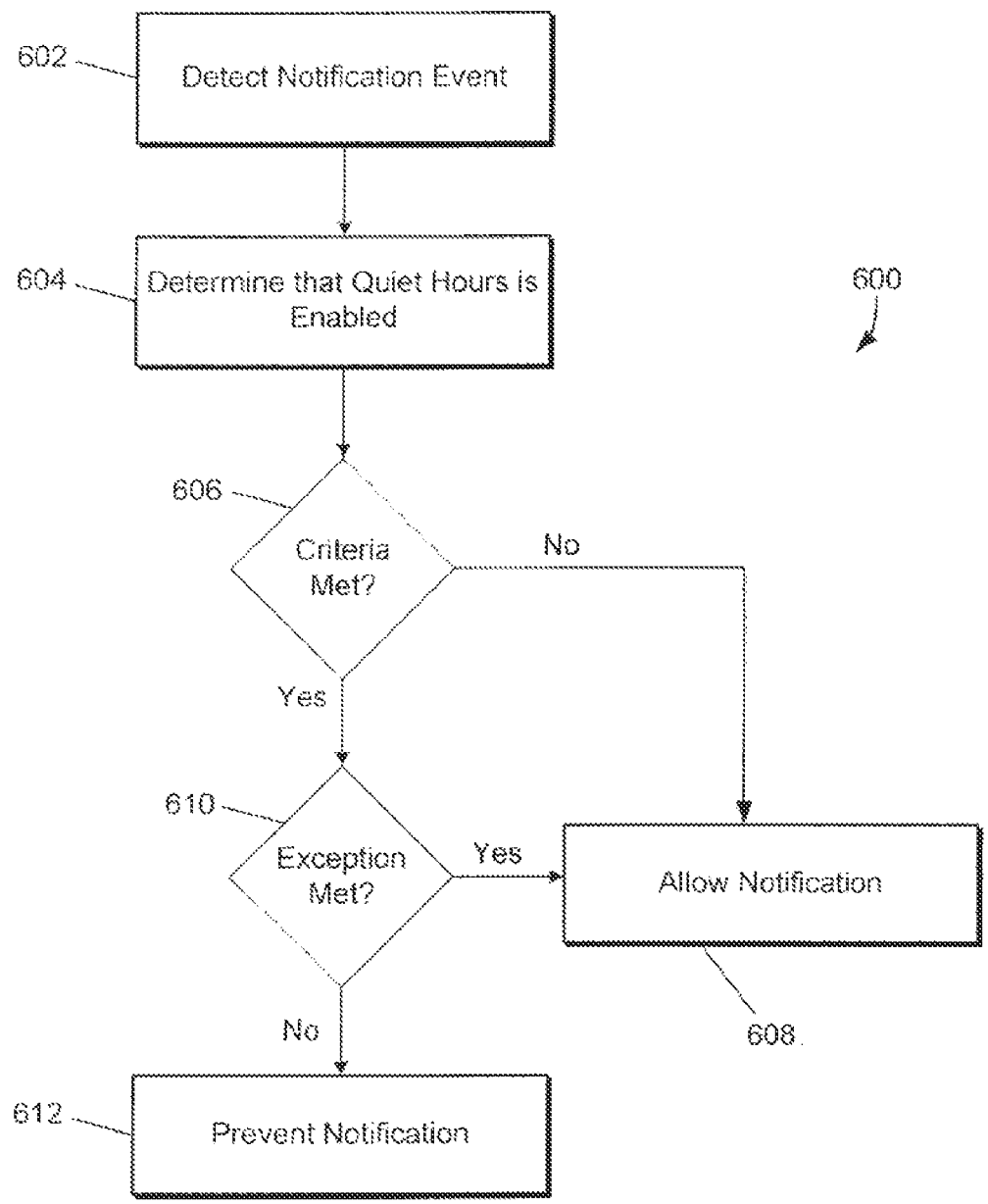
FIG. 6 is flow diagram of an example quiet hours process.

FIG. 6 is flow diagram 600 of an example quiet hours process. At step 602, a notification event is detected on a computing device. For example, a notification event can be associated with an incoming telephone call, a new voice message, receipt of an email, an alarm, a reminder associated with a calendar event, or any other event that can trigger a notification on the computing device.

At step 604, the computing device can determine that quiet hours are enabled on the computing device. For example, quiet hours can be enabled on the computing device through the interfaces described above with reference to FIGS. 1-4.

At step 606, the computing device can determine whether quiet hours criteria have been met. For example, quiet hours criteria can be time, location and/or movement based criteria. Quiet hours criteria can include a quiet hours schedule, calendar events, alarm clock events, movement/speed thresholds (e.g., corresponding to driving, walking, running, etc.), specified locations, for example. If the quiet hours criteria has not been met (e.g., the current time is not within a time period specified for quiet hours, the current location is not a designated quiet hours location, device movement does not exceed a specified threshold, etc.), then notifications generated for events detected by the computing device will not be suppressed.

If the quiet hours criteria has been met at step 606, then at step 610 the computing device can determine whether a quiet hours exception has been met. For example, a quiet hours exception can correspond to events associated with designated contacts, events that are determined to be urgent (e.g., where a caller calls again within a short period of time) or events that were initiated by the user of the computing device (e.g., a reply to a user-initiated phone call, text message, email, etc.). In some implementations, if one or more quiet hours exceptions are met, the computing device can allow a notification for the detected event at step 608. In some implementations, if no quiet hours exceptions are met, the computing device can prevent or suppress notifications for the detected event at step 612.

Example System Architecture

Figure 7:
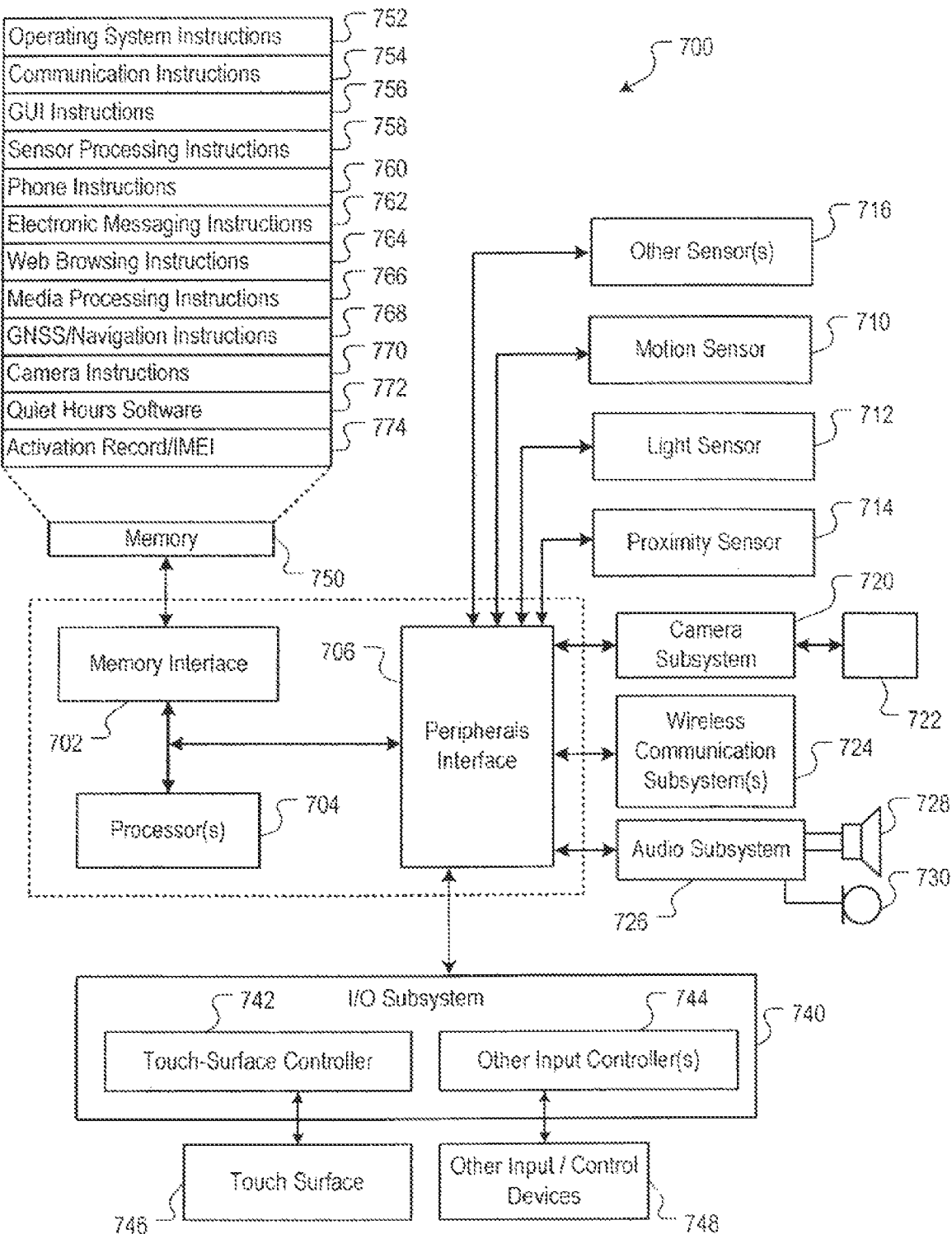
FIG. 7 is a block diagram of an exemplary system architecture implementing the features and processes of FIGS. 1-6.

FIG. 7 is a block diagram of an example computing device 700 that can implement the features and processes of FIGS. 1-6. The computing device 700 can include a memory interface 702, one or more data processors, image processors and/or central processing units 704, and a peripherals interface 706. The memory interface 702, the one or more processors 704 and/or the peripherals interface 706 can be separate components or can be integrated in one or more integrated circuits. The various components in the computing device 700 can be coupled by one or more communication buses or signal lines.

Sensors, devices, and subsystems can be coupled to the peripherals interface 706 to facilitate multiple functionalities. For example, a motion sensor 710, a light sensor 712, and a proximity sensor 714 can be coupled to the peripherals interface 706 to facilitate orientation, lighting, and proximity functions. Other sensors 716 can also be connected to the peripherals interface 706, such as a global navigation satellite system (GNSS) (e.g., GPS receiver), a temperature sensor, a biometric sensor, or other sensing device, to facilitate related functionalities.

A camera subsystem 720 and an optical sensor 722, e.g., a charged coupled device (CCD) or a complementary metal-oxide semiconductor (CMOS) optical sensor, can be utilized to facilitate camera functions, such as recording photographs and video clips. The camera subsystem 720 and the optical sensor 722 can be used to collect images of a user to be used during authentication of a user, e.g., by performing facial recognition analysis.

Communication functions can be facilitated through one or more wireless communication subsystems 724, which can include radio frequency receivers and transmitters and/or optical (e.g., infrared) receivers and transmitters. The specific design and implementation of the communication subsystem 724 can depend on the communication network(s) over which the computing device 700 is intended to operate. For example, the computing device 700 can include communication subsystems 724 designed to operate over a GSM network, a GPRS network, an EDGE network, a Wi-Fi or WiMax network, and a Bluetooth™ network. In particular, the wireless communication subsystems 724 can include hosting protocols such that the device 700 can be configured as a base station for other wireless devices.

An audio subsystem 726 can be coupled to a speaker 728 and a microphone 730 to facilitate voice-enabled functions, such as speaker recognition, voice replication, digital recording, and telephony functions. The audio subsystem 726 can be configured to facilitate presentation of sounds associated with notifications, as described above with reference to FIGS. 1-6.

The I/O subsystem 740 can include a touch-surface controller 742 and/or other input controller(s) 744. The touch-surface controller 742 can be coupled to a touch surface 746. The touch surface 746 and touch-surface controller 742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 746.

The other input controller(s) 744 can be coupled to other input/control devices 748, such as one or more buttons, rocker switches, thumb-wheel, infrared port, USB port, and/or a pointer device such as a stylus. The one or more buttons (not shown) can include an up/down button for volume control of the speaker 728 and/or the microphone 730.

In one implementation, a pressing of the button for a first duration can disengage a lock of the touch surface 746; and a pressing of the button for a second duration that is longer than the first duration can turn power to the computing device 700 on or off. Pressing the button for a third duration can activate a voice control, or voice command, module that enables the user to speak commands into the microphone 730 to cause the device to execute the spoken command. The user can customize a functionality of one or more of the buttons. The touch surface 746 can, for example, also be used to implement virtual or soft buttons and/or a keyboard.

In some implementations, the computing device 700 can present recorded audio and/or video files, such as MP3, AAC, and MPEG files. In some implementations, the computing device 700 can include the functionality of an MP3 player, such as an iPod™. The computing device 700 can, therefore, include a 36-pin connector that is compatible with the iPod. Other input/output and control devices can also be used.

The memory interface 702 can be coupled to memory 750. The memory 750 can include high-speed random access memory and/or non-volatile memory, such as one or more magnetic disk storage devices, one or more optical storage devices, and/or flash memory (e.g., NAND, NOR). The memory 750 can store an operating system 752, such as Darwin, RTXC, LINUX, UNIX, OS X, WINDOWS, or an embedded operating system such as VxWorks.

The operating system 752 can include instructions for handling basic system services and for performing hardware dependent tasks. In some implementations, the operating system 752 can be a kernel (e.g., UNIX kernel). In some implementations, the operating system 752 can include instructions for receiving quiet hours configuration input and enforcing quiet hours on the computing device. Operating system 752 can implement the quiet hours features described with reference to FIGS. 1-6.

The memory 750 can also store communication instructions 754 to facilitate communicating with one or more additional devices, one or more computers and/or one or more servers. The memory 750 can include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GNSS/Navigation instructions 768 to facilitate GNSS and navigation-related processes and instructions; and/or camera instructions 770 to facilitate camera-related processes and functions.

The memory 750 can store other software instructions 772 to facilitate other processes and functions, such as the quiet hours processes and functions as described with reference to FIGS. 1-6. For example, the software instructions can include instructions for receiving quiet hours configuration information from calendar and clock applications on the computing device.

The memory 750 can also store other software instructions (not shown), such as web video instructions to facilitate web video-related processes and functions; and/or web shopping instructions to facilitate web shopping-related processes and functions. In some implementations, the media processing instructions 766 are divided into audio processing instructions and video processing instructions to facilitate audio processing-related processes and functions and video processing-related processes and functions, respectively. An activation record and International Mobile Equipment Identity (IMEI) 774 or similar hardware identifier can also be stored in memory 750.

Each of the above identified instructions and applications can correspond to a set of instructions for performing one or more functions described above. These instructions need not be implemented as separate software programs, procedures, or modules. The memory 750 can include additional instructions or fewer instructions. Furthermore, various functions of the computing device 700 can be implemented in hardware and/or in software, including in one or more signal processing and/or application specific integrated circuits.

Therefore, according to the above, some examples of the disclosure are directed to a method comprising: detecting a notification event on a mobile device, where the mobile device is configured to generate sound, light, movement or a combination thereof in response to the notification event determining whether one or more criteria are met, where the one or more criteria include time-based, location-based or movement-based criteria; and preventing the mobile device from generating sound, light and/or movement in response to detecting the notification event when the one or more criteria are met. Additionally or alternatively to one or more of the examples disclosed above, in some examples the determining further comprises determining that the mobile device is near a pre-defined geographic location. Additionally or alternatively to one or more of the examples disclosed above, in some examples the determining further comprises determining that a time associated with the notification event falls within a specified time period. Additionally or alternatively to one or more of the examples disclosed above, in some examples the determining further comprises determining that a user-mode has been activated that silences the mobile device, including generating sound, light and/or movement. Additionally or alternatively to one or more of the examples disclosed above, in some examples the user-mode is manually activated and de-activated. Additionally or alternatively to one or more of the examples disclosed above, in some examples the determining further comprises determining the mobile device is moving faster than a threshold speed. Additionally or alternatively to one or more of the examples disclosed above, in some examples the determining further comprises determining the mobile device is slower faster than a threshold speed for a pre-determined amount of time. Additionally or alternatively to one or more of the examples disclosed above, in some examples the determining further comprises: determining that one or more exceptions are met; and allowing, in response to detecting the notification event when the one or more exceptions are met, the mobile device to generating sound, light or movement. Additionally or alternatively to one or more of the examples disclosed above, in some examples the determining the one or more exceptions is met further comprises determining that the notification event is associated with a contact stored in a contacts database on the mobile device. Additionally or alternatively to one or more of the examples disclosed above, in some examples the determining the one or more exceptions is met further comprises determining that the notification event is associated with a contact that is associated with a previous notification event that was detected within a threshold period of time.

Some examples of the disclosure are directed to a non-transitory computer-readable medium including one or more sequences of instructions which, when executed by one or more processors, causes: detecting a notification event on a mobile device, where the mobile device is configured to generate sound, light, movement or a combination thereof in response to the notification event; determining whether one or more criteria are met, where the one or more criteria include time-based, location-based or movement-based criteria; and preventing the mobile device from generating sound, light and/or movement in response to detecting the notification event when the one or more criteria are met. Additionally or alternatively to one or more of the examples disclosed above, in some examples the instructions that cause determining further comprise instructions that cause determining that the mobile device is near a pre-defined geographic location. Additionally or alternatively to one or more of the examples disclosed above, in some examples the instructions that cause determining further comprise instructions that cause determining that a time associated with the notification event falls within a specified time period. Additionally or alternatively to one or more of the examples disclosed above, in some examples the instructions that cause determining further comprise instructions that cause determining that a user-mode has been activated that silences the mobile device, including generating sound, light and/or movement. Additionally or alternatively to one or more of the examples disclosed above, in some examples the user-mode is manually activated and de-activated. Additionally or alternatively to one or more of the examples disclosed above, in some examples the instructions that cause determining further comprise instructions that cause determining the mobile device is moving faster than a threshold speed. Additionally or alternatively to one or more of the examples disclosed above, in some examples the instructions that cause determining further comprise instructions that cause determining the mobile device is slower faster than a threshold speed for a pre-determined amount of time. Additionally or alternatively to one or more of the examples disclosed above, in some examples the instructions that cause determining further comprise instructions that cause: determining that one or more exceptions are met; and allowing, in response to detecting the notification event when the one or more exceptions are met, the mobile device to generating sound, light or movement. Additionally or alternatively to one or more of the examples disclosed above, in some examples the instructions that cause determining the one or more exceptions is met further comprise instructions that cause determining that the notification event is associated with a contact stored in a contacts database on the mobile device. Additionally or alternatively to one or more of the examples disclosed above, in some examples the instructions that cause determining the one or more exceptions is met further comprise instructions that cause determining that the notification event is associated with a contact that is associated with a previous notification event that was detected within a threshold period of time.

Some examples of the disclosure are directed to a system comprising: one or more processors; and a non-transitory computer-readable medium including one or more sequences of instructions which, when executed by the one or more processors, causes: detecting a notification event on a mobile device, where the mobile device is configured to generate sound, light, movement or a combination thereof in response to the notification event; determining whether one or more criteria are met, where the one or more criteria include time-based, location-based or movement-based criteria; and preventing the mobile device from generating sound, light and/or movement in response to detecting the notification event when the one or more criteria are met. Additionally or alternatively to one or more of the examples disclosed above, in some examples the instructions that cause determining further comprise instructions that cause determining that the mobile device is near a pre-defined geographic location. Additionally or alternatively to one or more of the examples disclosed above, in some examples the instructions that cause determining further comprise instructions that cause determining that a time associated with the notification event falls within a specified time period. Additionally or alternatively to one or more of the examples disclosed above, in some examples the instructions that cause determining further comprise instructions that cause determining that a user-mode has been activated that silences the mobile device, including generating sound, light and/or movement. Additionally or alternatively to one or more of the examples disclosed above, in some examples the user-mode is manually activated and deactivated. Additionally or alternatively to one or more of the examples disclosed above, in some examples the instructions that cause determining further comprise instructions that cause determining the mobile device is moving faster than a threshold speed. Additionally or alternatively to one or more of the examples disclosed above, in some examples the instructions that cause determining further comprise instructions that cause determining the mobile device is slower faster than a threshold speed for a pre-determined amount of time. Additionally or alternatively to one or more of the examples disclosed above, in some examples the instructions that cause determining further comprise instructions that cause: determining that one or more exceptions are met; and allowing, in response to detecting the notification event when the one or more exceptions are met, the mobile device to generating sound, light or movement. Additionally or alternatively to one or more of the examples disclosed above, in some examples the instructions that cause determining the one or more exceptions is met further comprise instructions that cause determining that the notification event is associated with a contact stored in a contacts database on the mobile device. Additionally or alternatively to one or more of the examples disclosed above, in some examples the instructions that cause determining the one or more exceptions is met further comprise instructions that cause determining that the notification event is associated with a contact that is associated with a previous notification event that was detected within a threshold period of time.

The invention claimed is:

1. A method comprising:
at an electronic device with a display and one or more input devices:
receiving, via the one or more input devices, a first input indicating a request to configure a restricted-notification mode of the electronic device, wherein the restricted-notification mode operates in accordance with one or more restricted-notification criteria and restricts generation of notifications at the electronic device in response to notification events that are detected at the electronic device when the one or more restricted-notification criteria are satisfied;
in response to receiving the first input, displaying, on the display, one or more user interface elements for configuring the one or more restricted-notification criteria of the restricted-notification mode, including a first user interface element for associating the restricted-notification mode with a location of the electronic device when the first input was received;
while displaying the first user interface element for associating the restricted-notification mode with the location of the electronic device when the first input was received, receiving, via the one or more input devices, a second input that associates the restricted-notification mode with the location of the electronic device when the first input was received such that the one or more restricted-notification criteria include a respective criterion that is satisfied when a location of the electronic device is the location of the electronic device when the first input was received, and is not satisfied when the electronic device is no longer at the location of the electronic device when the first input was received; and
enabling the restricted-notification mode on the electronic device that operates in accordance with the one or more restricted-notification criteria, including the respective criterion.

2. The method of claim 1, wherein the respective criterion is satisfied when the location of the electronic device is within a first distance from the location of the electronic device when the first input was received, and is not satisfied when the electronic device is no longer within the first distance from the location of the electronic device when the first input was received.

3. The method of claim 2, wherein the one or more user interface elements for configuring the one or more restricted-notification criteria of the restricted-notification mode further include a second user interface element for configuring a value of the first distance.

4. The method of claim 1, further comprising: receiving a third input indicating a request to edit, via the first user interface element, the location of the electronic device when the first input was received.

5. The method of claim 1, wherein the one or more user interface elements for configuring the one or more restricted-notification criteria of the restricted-notification mode further include a second user interface element for presenting a map corresponding to the location of the electronic device when the first input was received.

6. The method of claim 1, further comprising: saving the location of the electronic device when the first input was received to a list of locations.

7. The method of claim 6, wherein the one or more user interface elements further includes a second user interface element for displaying the list of locations.

8. The method of claim 1, wherein the one or more user interface elements for configuring the one or more restricted-notification criteria of the restricted-notification mode further include a second user interface element for associating the restricted-notification mode with a specified time period.

9. The method of claim 1, wherein the second input corresponds to a request to add a new location for the restricted-notification mode.

10. The method of claim 1, further comprising:
while the restricted-notification mode that operates in accordance with the one or more restricted-notification criteria, including the respective criterion, is active, detecting an indication that the electronic device is no longer at the location of the electronic device when the first input was received; and
in response to detecting the indication, deactivating the restricted-notification mode that operates in accordance with the one or more restricted-notification criteria, including the respective criterion.

11. An electronic device with a display and one or more input devices, the electronic device configured to perform a method comprising:

receiving, via the one or more input devices, a first input indicating a request to configure a restricted-notification mode of the electronic device, wherein the restricted-notification mode operates in accordance with one or more restricted-notification criteria and restricts generation of notifications at the electronic device in response to notification events that are detected at the electronic device when the one or more restricted-notification criteria are satisfied;

in response to receiving the first input, displaying, on the display, one or more user interface elements for configuring the one or more restricted-notification criteria of the restricted-notification mode, including a first user interface element for associating the restricted-notification mode with a location of the electronic device when the first input was received;

while displaying the first user interface element for associating the restricted-notification mode with the location of the electronic device when the first input was received, receiving, via the one or more input devices, a second input that associates the restricted-notification mode with the location of the electronic device when the first input was received such that the one or more restricted-notification criteria include a respective criterion that is satisfied when a location of the electronic device is the location of the electronic device when the first input was received, and is not satisfied when the electronic device is no longer at the location of the electronic device when the first input was received; and enabling the restricted-notification mode on the electronic device that operates in accordance with the one or more restricted-notification criteria, including the respective criterion.

12. The electronic device of claim 11, wherein the respective criterion is satisfied when the location of the electronic device is within a first distance from the location of the electronic device when the first input was received, and is not satisfied when the electronic device is no longer within the first distance from the location of the electronic device when the first input was received.

13. The electronic device of claim 12, wherein the one or more user interface elements for configuring the one or more restricted-notification criteria of the restricted-notification mode further include a second user interface element for configuring a value of the first distance.

14. The electronic device of claim 11, further configured to perform the method comprising:

receiving a third input indicating a request to edit, via the first user interface element, the location of the electronic device when the first input was received.

15. The electronic device of claim 11, wherein the one or more user interface elements for configuring the one or more restricted-notification criteria of the restricted-notification mode further include a second user interface element for presenting a map corresponding to the location of the electronic device when the first input was received.

16. The electronic device of claim 11, further configured to perform the method comprising:

saving the location of the electronic device when the first input was received to a list of locations.

17. The electronic device of claim 16, wherein the one or more user interface elements further includes a second user interface element for displaying the list of locations.

18. The electronic device of claim 11, wherein the one or more user interface elements for configuring the one or more restricted-notification criteria of the restricted-notification mode further include a second user interface element for associating the restricted-notification mode with a specified time period.

19. The electronic device of claim 11, wherein the second input corresponds to a request to add a new location for the restricted-notification mode.

20. The electronic device of claim 11, further configured to perform the method comprising:

while the restricted-notification mode that operates in accordance with the one or more restricted-notification criteria, including the respective criterion, is active, detecting an indication that the electronic device is no longer at the location of the electronic device when the first input was received; and in response to detecting the indication, deactivating the restricted-notification mode that operates in accordance with the one or more restricted-notification criteria, including the respective criterion.

21. A non-transitory computer-readable medium including one or more sequences of instructions which, when executed by one or more processors of an electronic device having a display and one or more input devices, cause the electronic device to perform a method comprising:

receiving, via the one or more input devices, a first input indicating a request to configure a restricted-notification mode of the electronic device, wherein the restricted-notification mode operates in accordance with one or more restricted-notification criteria and restricts generation of notifications at the electronic device in response to notification events that are detected at the electronic device when the one or more restricted-notification criteria are satisfied;

in response to receiving the first input, displaying, on the display, one or more user interface elements for configuring the one or more restricted-notification criteria of the restricted-notification mode, including a first user interface element for associating the restricted-notification mode with a location of the electronic device when the first input was received;

while displaying the first user interface element for associating the restricted-notification mode with the location of the electronic device when the first input was received, receiving, via the one or more input devices, a second input that associates the restricted-notification mode with the location of the electronic device when the first input was received such that the one or more restricted-notification criteria include a respective criterion that is satisfied when a location of the electronic device is the location of the electronic device when the first input was received, and is not satisfied when the electronic device is no longer at the location of the electronic device when the first input was received; and enabling the restricted-notification mode on the electronic device that operates in accordance with the one or more restricted-notification criteria, including the respective criterion.

22. The non-transitory computer-readable medium of claim 21, wherein the respective criterion is satisfied when the location of the electronic device is within a first distance from the location of the electronic device when the first input was received, and is not satisfied when the electronic device is no longer within the first distance from the location of the electronic device when the first input was received.

23. The non-transitory computer-readable medium of claim 22, wherein the one or more user interface elements for configuring the one or more restricted-notification criteria of the restricted-notification mode further include a second user interface element for configuring a value of the first distance.

24. The non-transitory computer-readable medium of claim 21, including the one or more sequences of instructions which further cause the electronic device to perform the method comprising:
receiving a third input indicating a request to edit, via the first user interface element, the location of the electronic device when the first input was received.

25. The non-transitory computer-readable medium of claim 21, wherein the one or more user interface elements for configuring the one or more restricted-notification criteria of the restricted-notification mode further include a second user interface element for presenting a map corresponding to the location of the electronic device when the first input was received.

26. The non-transitory computer-readable medium of claim 21, including the one or more sequences of instructions which further cause the electronic device to perform the method comprising:
saving the location of the electronic device when the first input was received to a list of locations.

27. The non-transitory computer-readable medium of claim 26, wherein the one or more user interface elements further includes a second user interface element for displaying the list of locations.

28. The non-transitory computer-readable medium of claim 21, wherein the one or more user interface elements for configuring the one or more restricted-notification criteria of the restricted-notification mode further include a second user interface element for associating the restricted-notification mode with a specified time period.

29. The non-transitory computer-readable medium of claim 21, wherein the second input corresponds to a request to add a new location for the restricted-notification mode.

30. The non-transitory computer-readable medium of claim 21, including the one or more sequences of instructions which further cause the electronic device to perform the method comprising:
while the restricted-notification mode that operates in accordance with the one or more restricted-notification criteria, including the respective criterion, is active, detecting an indication that the electronic device is no longer at the location of the electronic device when the first input was received; and
in response to detecting the indication, deactivating the restricted-notification mode that operates in accordance with the one or more restricted-notification criteria, including the respective criterion.

* * * * *